UNITED STATES PATENT OFFICE.

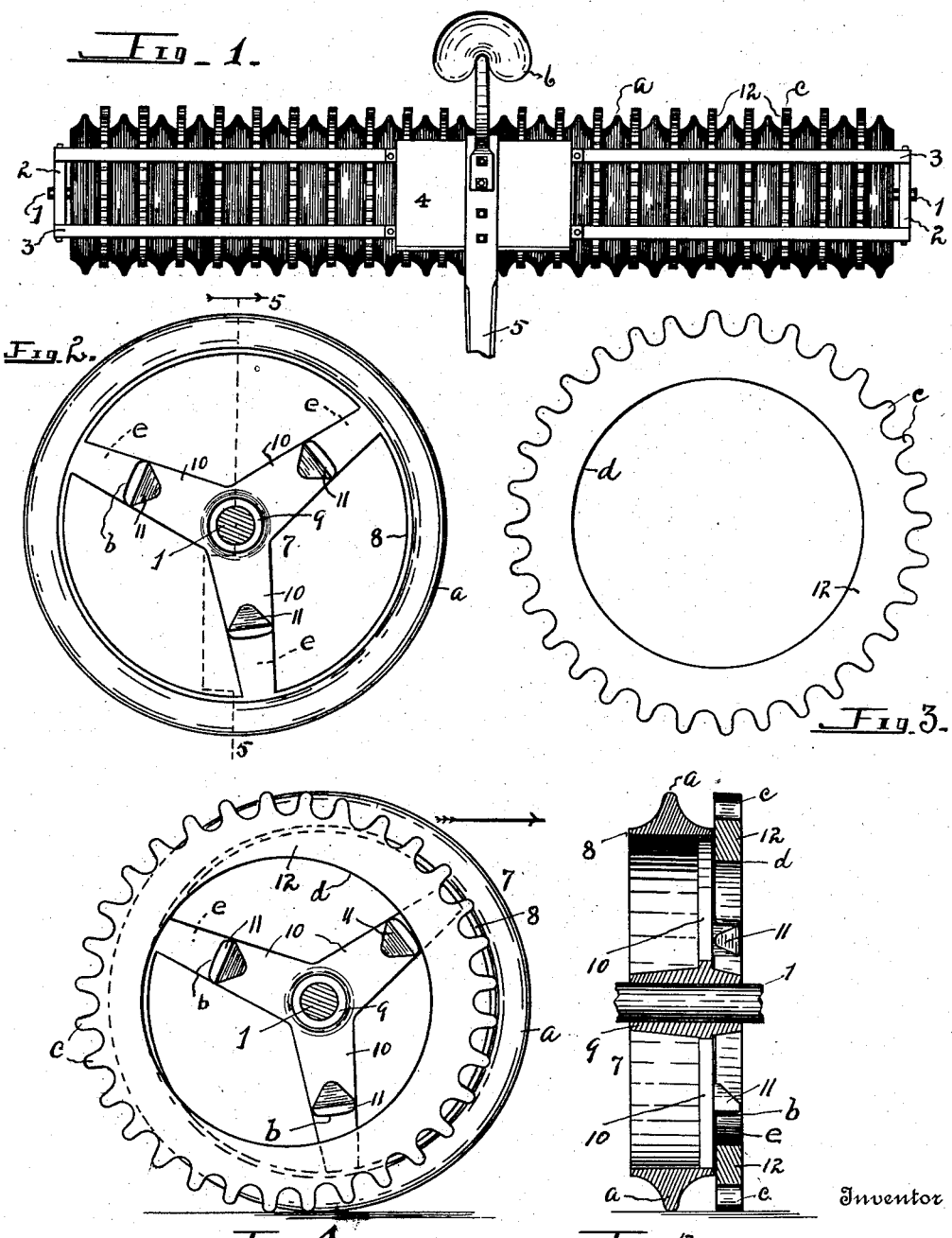

LAURITS T. RASMUSSEN, OF COUNCIL BLUFFS, IOWA, ASSIGNOR TO WALKER MANUFACTURING COMPANY, OF COUNCIL BLUFFS, IOWA, A CORPORATION OF SOUTH DAKOTA.

PACKING AND MULCHING IMPLEMENT.

1,091,243. Specification of Letters Patent. Patented Mar. 24, 1914.

Application filed February 28, 1913. Serial No. 751,277.

*To all whom it may concern:*

Be it known that I, LAURITS T. RASMUSSEN, a citizen of the United States, residing at Council Bluffs, in the county of Pottawattamie and State of Iowa, have invented certain new and useful Improvements in Packing and Mulching Implements, of which the following is a specification.

This invention relates to a combined packer and mulcher, useful for pulverizing and smoothing the surface of land which has been plowed, cultivated or seeded, and in connection therewith to form pockets for retaining moisture.

The invention includes the use of peripherally tapered disks to form grooves and ridges, and the employment, intermediate the disks, of toothed, annular plates or disks, so arranged that they form indentations or perforations in the ground.

The invention has reference particularly to the mounting of the toothed plates or disks, so that sand or substances which ordinarily cause friction, will become loosened from their bearings, and providing such a construction that, while substantially of the same diameter as the other disks, they will be disposed rearwardly, to cause the perforations to be made on the crest of ridges which have been formed, packed and pulverized by the other disks.

The invention consists of the novel construction, combination and arrangement of parts as described herein and claimed, and as illustrated in the drawing, wherein,—

Figure 1 is a plan view of a combined packer and mulcher embodying my invention. Fig. 2 is a side-view of a peripherally tapered disk. Fig. 3 is a side view of a toothed disk. Fig. 4 is a side elevation of a toothed disk mounted upon a peripherally tapered disk. Fig. 5 is a transverse section of a peripherally tapered disk on line 5 5 of Fig. 2, a toothed disk in transverse section being added, to show relative position of parts.

Referring now to the drawing for a more particular description, numeral 1 indicates a shaft or axle, which may be mounted in any suitable frame, the frame herein shown being the end-pieces 2 in which the ends of the shaft have bearings, these end-pieces being connected by substantially parallel strips 3; and midway between the ends of the strips and secured thereon is a platform 4 upon which the tongue 5 and driver's seat 6 are secured.

At 7 (Figs. 2, 5) are indicated peripherally tapered disks, each having a tire 8 provided with an outwardly tapered ridge $a$, the hub and spokes being respectively indicated at 9 and 10. The spokes may be cast integral with the tire and hub, if desired, and the spokes preferably are so arranged that they form a web disposed in alinement with one of the edges of the tire. At uniform radial distances upon the spokes are provided lugs 11. They provide bearing surfaces $b$ extending parallel with the axis of the peripherally tapered disk and disposed laterally and outwardly of the periphery thereof. The peripherally tapered disks 7, for convenience of description, will hereinafter be designated as primary disks.

At 12 are indicated annular plates or secondary disks, each being provided with peripheral prongs or teeth $c$, its aperture providing a bearing-wall $d$. These secondary disks are mounted upon the lugs 11 of the primary disks, their thickness preferably being equal to the length of the lugs, so that they will be supported; and when the parts of the implement are assembled, one of the secondary disks will be disposed between two primary disks.

By referring to Figs. 4 and 5 it will be seen that the inner bearing-wall $d$ of each secondary disk 12 has an adequate diameter so that only one or two of lugs 11 will make contact with it at the same time, and this construction is of advantage, since their teeth or projections should not be pressed into the ground with a force equal to the pressure exerted upon the primary disks, also the indentations or perforations should be made by the teeth after the ground has been packed.

Since the apertures of the annular plates or secondary disks 12 provide bearing walls $d$ of greater diameter than the combined radial distance of any two of lugs 11 from the axis of disks 7, a recess, pocket or operating-space $e$ is provided for their movement, and therefore when the implement is moving forwardly the secondary disks will be disposed rearwardly of the primary disks, and they will be pressed downward by their own weight, the combined weight of other parts of the implement exerting no pressure upon said secondary disks.

Since lugs 11 are disposed midway between the ends of the spokes, the leverage which they provide is greater for sustaining all of the stresses to which the secondary disks are subjected, than would be the case if they were supported nearer the axle, and this feature adds to the durability of the lugs and disks, and materially reduces any liability for the breakage of the lugs. Also on account of the spaces e, above mentioned, sand, or substances which usually produce friction, will not accumulate on surfaces b of the lugs, but during the movement of the implement, will be dislodged therefrom.

The primary and secondary disks may be constructed of any suitable diameters. While I have shown and prefer uniform diameters for these members, it is obvious that the diameter of the secondary disks may be greater or less than that of the primary disks and operation will be substantially the same, since the secondary disks are completely separated from the primary disks, and are not controlled by them except when the inner bearing-wall b is engaged by one or two of the lugs 11.

The benefit derived by use of packing-disks for agricultural purposes is so well known that no description is required. The object of mulching the ground in conjunction with packing is to form small indentations in the ground between the grooves to aid in retaining moisture. The herein described implement operates to advantage for this purpose. The parts as described may be conveniently constructed, and are durable in wear.

In the use of packing disks as ordinarily constructed, adhesive soil may become deposited upon and often projects over the edges of the peripheries. Since disks 12 are disposed rearwardly of disks 7, as shown in the present construction, it may be stated that the presentation of the peripheries of these members outwardly of each other at the front and rear of the implement, will operate to dislodge these adhesions to a considerable extent, and this feature is considered to be of importance, especially when the implement is employed for packing and mulching certain kinds of soils.

Having fully described my invention, what I claim and desire to secure by Letters Patent is,—

1. An implement for the purposes described, comprising in combination with a frame and an axle journaled therein, disk-members formed with tapered peripheries and mounted upon the axle, each of said disk-members being formed with a web disposed flush with one edge of its periphery and connected with its hub and provided with bearing-lugs intermediate its hub and said periphery; a plurality of annular plates provided with peripheral projections and disposed to circumscribe the axle intermediate said disk-members in the plane of said lugs, the diameter of the apertures of said plates being of sufficient extent to prevent coincident contact with all of said lugs.

2. An implement for the purposes described, comprising, in combination with a supported axle, disk-members mounted thereon, each of said disk-members being provided with spokes disposed in alinement with one edge of its tire and provided with bearing-lugs intermediate its hub and said tire; a plurality of annular plates provided with peripheral projections and interposed between the disk-members to circumscribe said lugs, the apertures of said plates being of sufficient extent to prevent coincident contact of the plates with all of said lugs.

In testimony whereof I have affixed my signature in presence of two witnesses.

LAURITS T. RASMUSSEN.

Witnesses:
 HIRAM A. STURGES,
 L. M. THOMAS.